United States Patent [19]
Keller et al.

[11] Patent Number: 5,010,482
[45] Date of Patent: Apr. 23, 1991

[54] MULTI-EVENT MECHANISM FOR QUEUING HAPPENED EVENTS FOR A LARGE DATA PROCESSING SYSTEM

[75] Inventors: John A. Keller, Coatesville; Barry S. Traylor, Downingtown; Robert H. Tickner, Paoli, all of Pa.

[73] Assignee: Unisys Corp., Detroit, Mich.

[21] Appl. No.: 328,812

[22] Filed: Mar. 23, 1989

Related U.S. Application Data

[63] Continuation of Ser. No. 68,860, Jul. 2, 1987, abandoned.

[51] Int. Cl.[5] .................................................. G06F 9/46
[52] U.S. Cl. ................................. 364/200; 364/281.3; 364/281.7; 364/281.8; 364/254.6
[58] Field of Search ... 364/200 MS File, 900 MS File

[56] References Cited

U.S. PATENT DOCUMENTS

| | | | |
|---|---|---|---|
| 3,548,384 | 12/1970 | Barton et al. | 364/200 |
| 3,614,745 | 10/1971 | Podvin et al. | 364/200 |
| 3,665,421 | 5/1972 | Rehhausser et al. | 364/200 |
| 4,286,322 | 8/1981 | Hoffman et al. | 364/200 |
| 4,379,326 | 4/1983 | Anastas et al. | 364/200 |
| 4,384,324 | 5/1983 | Kim et al. | 364/200 |
| 4,432,051 | 2/1984 | Bogaert et al. | 364/200 |
| 4,736,318 | 4/1988 | Delyani et al. | 364/200 |
| 4,779,194 | 10/1988 | Jennings et al. | 364/200 |
| 4,809,159 | 7/1989 | Sowa | 364/200 |

Primary Examiner—Thomas C. Lee
Attorney, Agent, or Firm—Nathan Cass; Mark T. Starr

[57] ABSTRACT

A mechanism for queuing a set of happened events in order of their occurrence and allowing for multiple occurrences to result in multiple processing iterations which mechanism maintains a multi-event table which is really a table of multi-event designations to be allocated to different processes upon request where the requesting processes assign a particular function with each multi-event entry and each of its own related event designations. The mechanism of the present invention maintains the state of such allocated multi-event entries in the multi-event table and signals the related or ("receiving") process that an event has happened within that set, and, if there are multiple events in the set which are happened, which of those events, occurred first by returning the events signature so that the particular system central processors assigned to execute those particular processes may then proceed with their execution and perform whatever processing is required for that particular event needing attention first.

11 Claims, 12 Drawing Sheets

BEFORE ENTR

AFTER ENTR

| 16 | | | | 11 | | | 7 | | | | | 0 |
|---|---|---|---|---|---|---|---|---|---|---|---|---|
| 0 | S E L F | A B L E | CLASS | | | READY QUEUE FORWARD LINK (PROCESS*) | | | | | | |
| 1 | S E L F | A B L E | CLASS | | | READY QUEUE REVERSE LINK (PROCESS*) | | | | | | |
| 2 | | CURRENT BASE PRIORITY | | | | | CURRENT FINE PRIORITY | | | | | |
| 3 | | ORIGINAL BASE PRIORITY | | | | | CPM TYPE | PROCESS STATE | | | | |

MULTI-EVENT MECHANISM FOR QUEUING HAPPENED EVENTS FOR A LARGE DATA PROCESSING SYSTEM

This is a continuation of co-pending application Ser. No. 07/068,860, filed on July 2, 1987, now abandoned.

RELATED U.S. PATENT APPLICATIONS

U.S. patent applications directly or indirectly related to the subject application are as follows:

Ser. No. 787,669, filed 10/15/85, by A. T. Jennings et al. and entitled "EVENT ALLOCATION MECHANISM FOR A LARGE DATA PROCESSING SYSTEM," now U.S. Pat. No. 4,779,194, issued Oct. 18, 1988.

BACKGROUND OF THE INVENTION

1. Field of the Invention

This invention relates to a multi-event queuing mechanism and more particularly to such a mechanism for off-loading many operating system functions that would otherwise be executed by one or more central processors in a large data processing system.

2. Description of the Prior Art

Multi-processing systems and a single processing system adapted for multi-programming require operating systems for the purpose of scheduling tasks on a particular processor, initiating input/output data transfers, handling external interrupts, and the like. Such operating systems, sometimes called a master control program (MCP), actually consist of many different particular processes and subroutines, each of which has a particular function. Such particular process and subroutine resides in main memory and currently must be executed by the particular central processors when a processor or another central processor in a multi-processisng system requires service, such as when it has finished a particular process or task, requires an input/output operation or some other service.

More specifically, among other things, the operating systems allocate and deallocate events where an event may represent an external interrupt, I/O operation, etc.; implement a set of functions which may be performed upon these events; maintain the status of processes or tasks running on the system; perform task priority computations and schedule the execution of tasks by various central processors; maintain the system timers, including the interval timers; and perform some accounting and billing functions.

Statistical studies indicate that a major portion of each processor's time, in a multi-processing system, is employed in executing operating system functions. From these studies, it is estimated that the overhead of such management functions has been anywhere between ten percent and fifty percent, and occasionally even higher. Furthermore, a goodly portion of the time that the corresponding central processor is executing operating system functions is employed in establishing process priority, performing functions on events (as defined above) and initiating input/output operations. If even these latter functions could be removed from the operating systems, then the through-put of the data processing system should be substantially enhanced.

At times, the operating system is required to continually process on a set of events, any one of which may happen and require processing from time to time. In order to do this, the operating system must wait on all events within this set simultaneously. When one of the multiple events has occurred, the operating system processes that event and must again wait on all of the events. If additional events happen during the time which the operating system is processing the first event, when the operating system again waits on the events it has no way of telling which of the events occurred first in time.

The mechanism of the present invention also maintains a multi-event table which contains the state of allocated multi-event entries as well as a list of unallocated entries in the table. The mechanism of the present invention signals the "receiving" (or waiting) process when an event associated with the particular table entry has happened so that the particular central processor assigned to execute the particular process may then process as appropriate for the particular event. The mechanism of the present invention also maintains a queue of such happened events associated with the particular table entry such that if the rate at which incoming happened events exceeds the rate of processing, the events are queued up in the order in which they happened. This queue is maintained whether or not a process is currently receiving on the particular multi-event entry. In addition, the processor of the present invention maintains certain event states which are associated with the multi-event table functions, such as which particular multi-event entry a particular event is associated with, whether the event is happened, and whether or not the processor of the present invention should maintain a count of the number of times this event occurs such that it may be processed multiple times even if the operating system cannot process the event as fast as it can occur.

It is then the object of the present invention to provide a data processing system having improved throughput.

It is another object of the present invention to provide an improved data processing system wherein those operating system functions which require most of the central processor time are removed from the main memory of the system.

It is still a further object of the present invention to provide an improved data processing system having facilities for performing those functions that would otherwise be a part of the operating systems stored in memory.

SUMMARY OF THE INVENTION

In order to accomplish the above-identified objects, the present invention resides in a special purpose processor for a large data processing system which special purpose processor performs many of the functions of the system operating systems that utilize most of the central processor's running time when those processors are executing routines of the operating systems stored in main memory. More specifically, the basic functions of the special purpose processor are that of process or task scheduling and the allocation of events to such processes or tasks, which events are requested by or affect the execution of the individual tasks.

Particularly, such a processor maintains a queue of ready or available processes linked together according to an assigned priority so that any central processor may be assigned to the highest priority task when that processor is not busy executing some higher priority task. The special purpose processor also includes a mechanism for computing task priorities as new tasks are inserted into the queue or removed.

The processor of the present invention also maintains an event table which is really a table of event designations to be allocated to different processes upon request where the requesting processes (including the MCP) assign a particular function or "meaning" to the event designation. The processor of the present invention maintains the state of such allocated events in the event table and signals requesting (or "waiting") processes that an event has happened so that the particular central processors assigned to execute those particular processes may then proceed with their execution.

A feature then of the present invention resides in a special purpose processor for a large data processing system which processor maintains a queue of ready processes linked together in the order of their assigned priority so that they may be executed by the various central processors of the system as those central processors become available and also a multi-event allocation mechanism for allocating a number of available multi-event entries to the various processes upon request.

BRIEF DESCRIPTIONS OF THE DRAWINGS

The above and other objects, advantages and features of the present invention will become more readily apparent from a review of the following specification when taken in conjunction with the drawings wherein:

FIG. 1 is a diagram of the large data processing system employing the present invention;

FIG. 2A-D are diagrams representing a portion of memory containing data arranged as push-down stacks and also a plurality of display registers used to access various elements within the stack;

FIG. 3 is a schematic diagram of the special purpose processor of the present invention;

FIGS. 4A and B are respectively a schematic of the process table and also the four-word format for a particular process which four-word blocks are stored in the process table;

FIGS. 5A-D are formats of the four words representing an event as stored in the event table of the present invention;

Figure 9A:
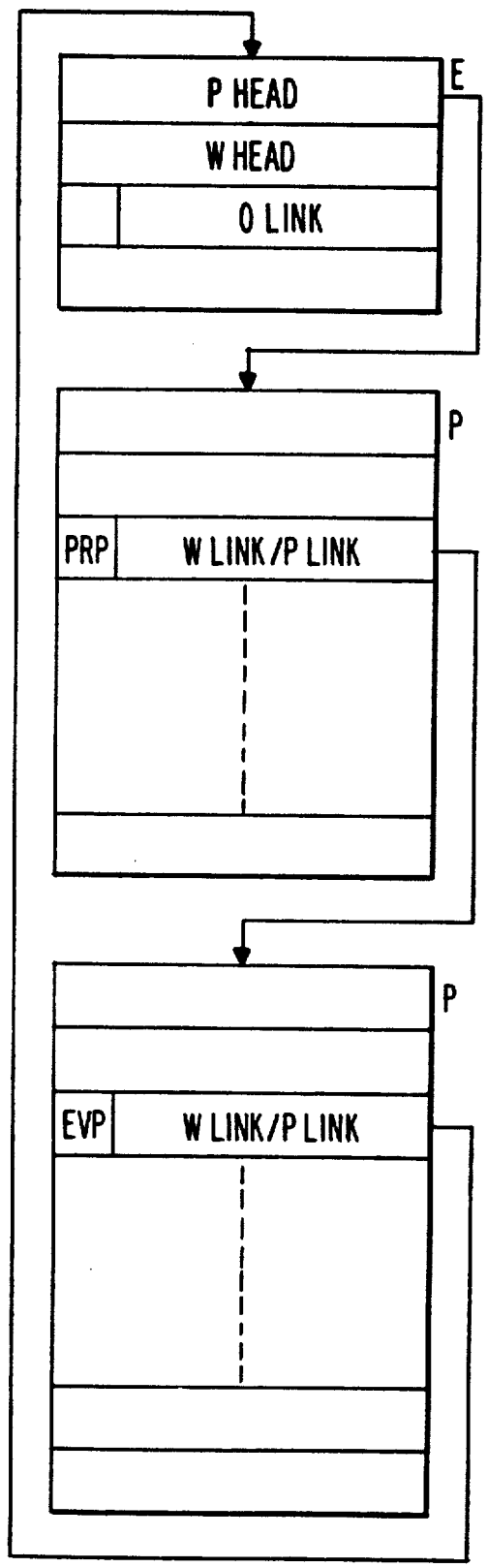
Figure 11A:
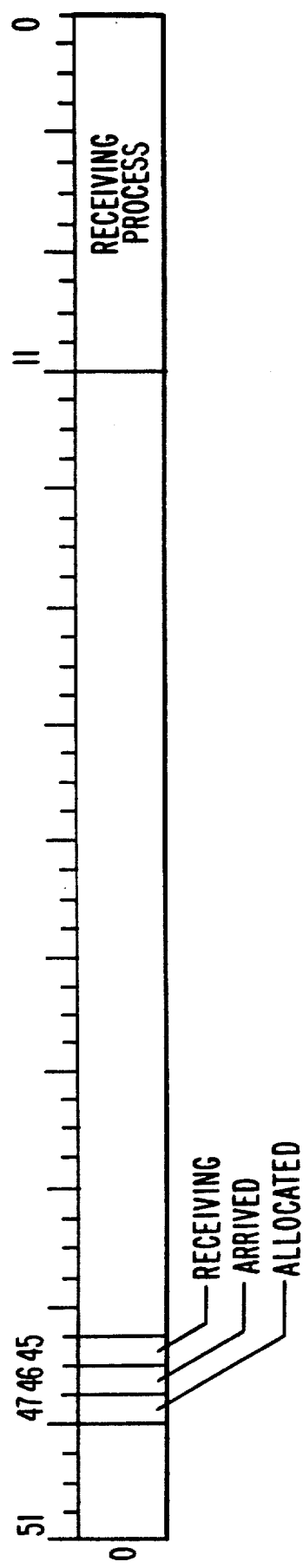
Figure 11B:
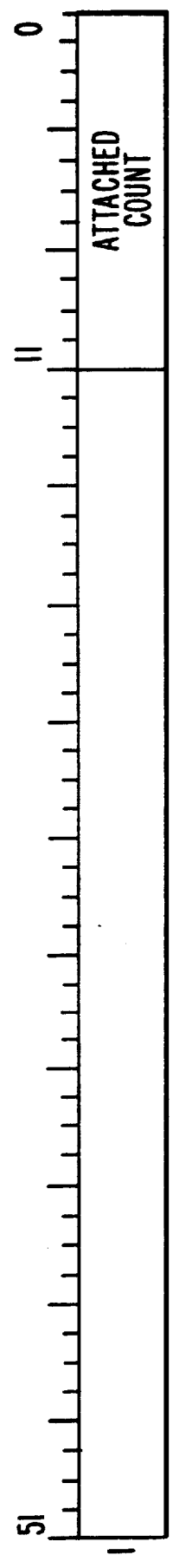
Figure 11C:
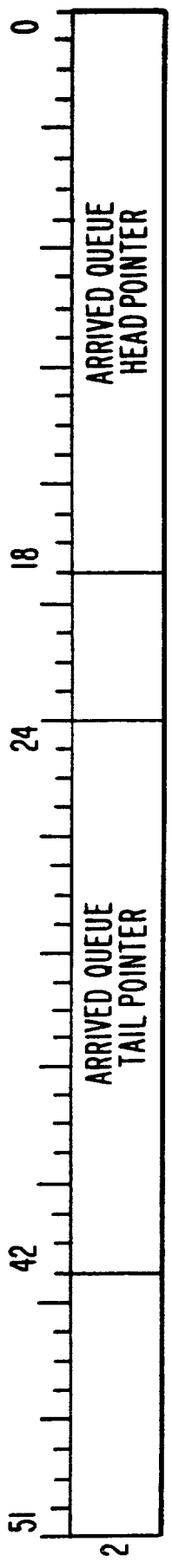
Figure 12:
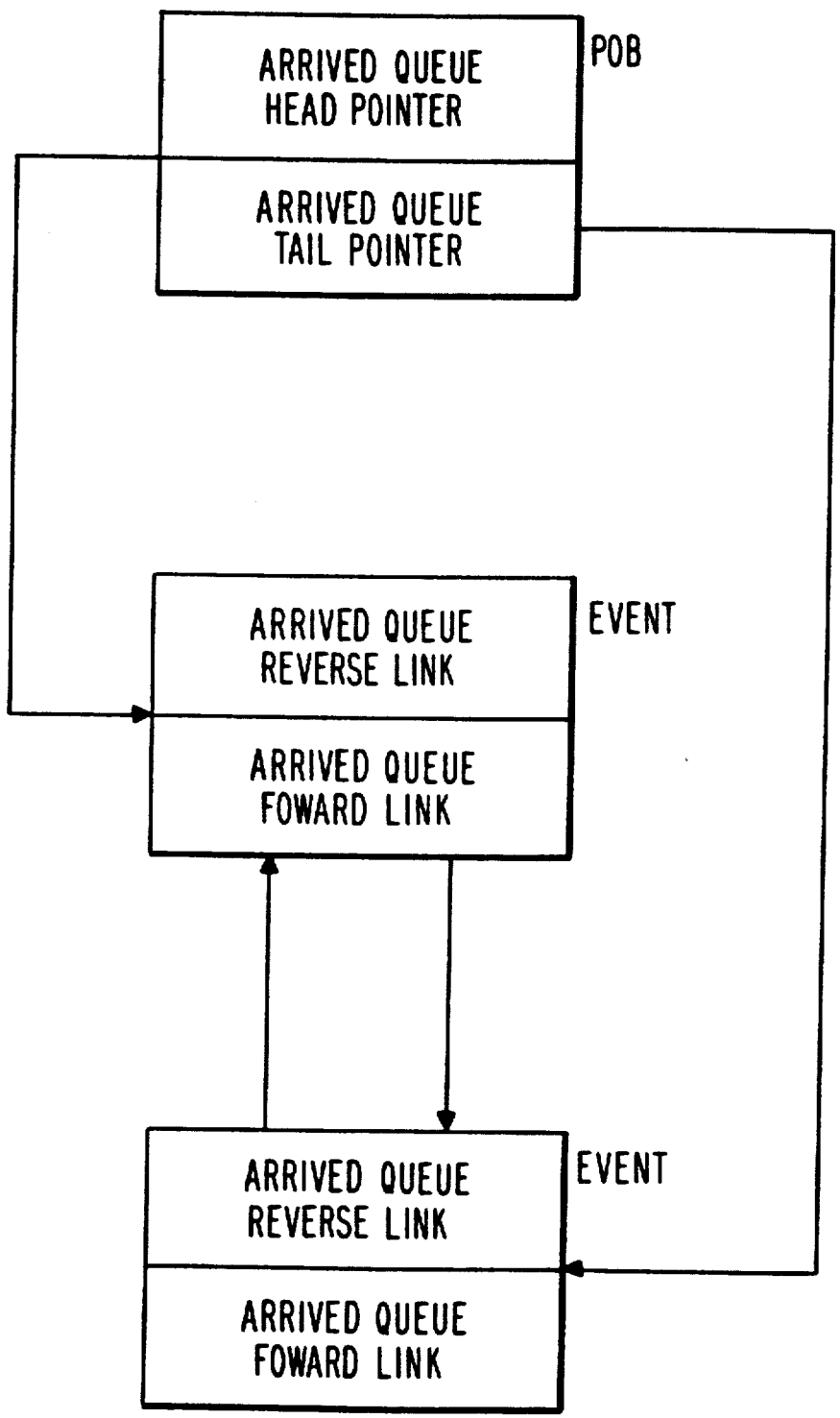

FIGS. 9A and B are diagrams illustrating the manner in which processes are linked in a queue according to priority when waiting to procure an event and how processes waiting upon the same event to happen are so linked;

FIGS. 10A-D are formats of the four words representing an inscribed event, as stored in the event table of the present invention;

FIGS. 11A-C are formats of the three words representing a multi-event entry, as stored in the multi-event table of the present invention; and FIG. 12 is a diagram illustrating the manner in which inscribed events are linked in a queue according to first occurence when arrived at their multi-event entry.

GENERAL DESCRIPTION OF THE INVENTION

Figure 1:
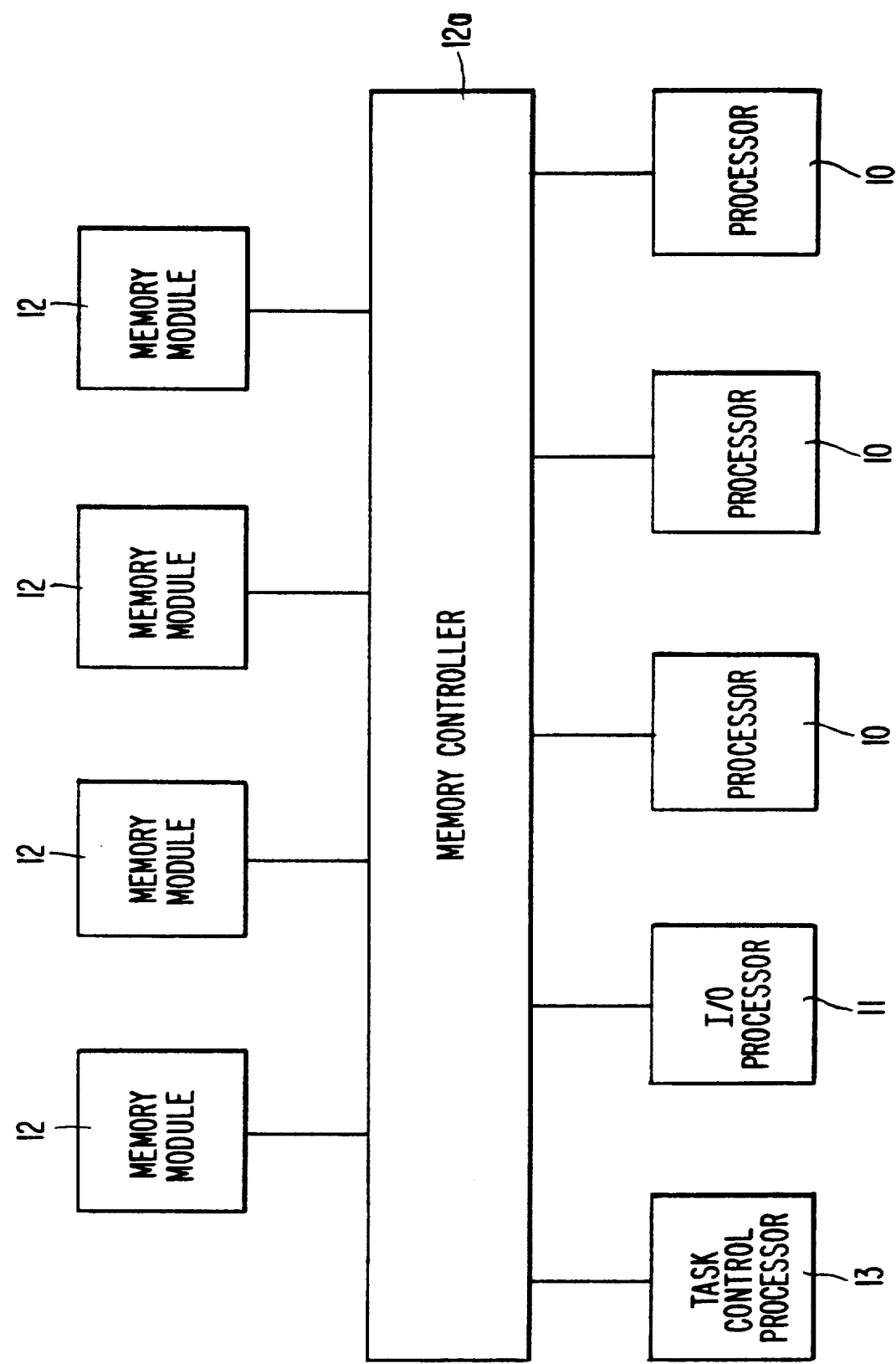

A large data processing system, and in particular a multi-processing system, which employs the present invention is illustrated in FIG. 1. The system includes a plurality of main processing units 10 and one or more I/O processors 11, each of which can communicate with a plurality of memory modules 12, by way of memory controller 12a. The present invention is an addition to the system in the form of ask control processor 13 which also communicates with any one of processors 10 by way of controller 12a.

While the present invention may be used in a conventional system of sequential or von Neumann type processors, the preferred embodiment of the present invention, as described below, is directed toward a system of processors designed for the execution of block-structured programming languages, i.e., nested declarations, which is a natural form for the expression of complex algorithms. A particular processor that was designed to employ such block-structured, or nested languages, is described in the Barton et al. U.S. Pat. Nos. 3,461,434; 3,546,677 and 3,548,384. These patents describe a stack-oriented data processor where the stack mechanism, a first-in last-out mechanism, handles the flow of operators and associated parameters in a manner which reflects the nested structure of the particular higher level languages employed. Such languages include ALGOL and ALGOL-type languages, such a PL/1, EULER, etc. (Cf., E. I. Organick *Computer System Organization*, Academic Press, 1973).

A system of the type described in the above-identified Barton patents is oriented around the concept of a segmented memory and specially treated segments called stacks. The processor runs in an expression stack; operators take their arguments from the top of the stack and leave their results on the top of the stack. The data addressing space of the executing program is mapped into the stack as well as other stacks linked to it and data segments referenced by the descriptors contained in the stack structure.

The addressing environment of the executing code stream consists of a set of local addressing spaces contained within the stacks. These are called activation records or lexical regions and each consists of a set of variables addressed by an index relative to the base of the activation record. That is to say, addressing of a given data item is by way of an address couple of the form (Lambda, Delta) where Lambda is the lexical level of a given activation record in the stack and Delta is the offset to the variable from the base of the activation record at level Lambda. In order to access any activation record within a stack, the respective records, or lexical regions, are linked together by pointers from the base of the topmost activation record to the lowest level activation record. In the above-described Barton patents, addressing is optimized by defining an array of "display" registers in the processor which registers are maintained in such a manner that element i in the array contains the base of the activation record at the level i.

Figure 2A:
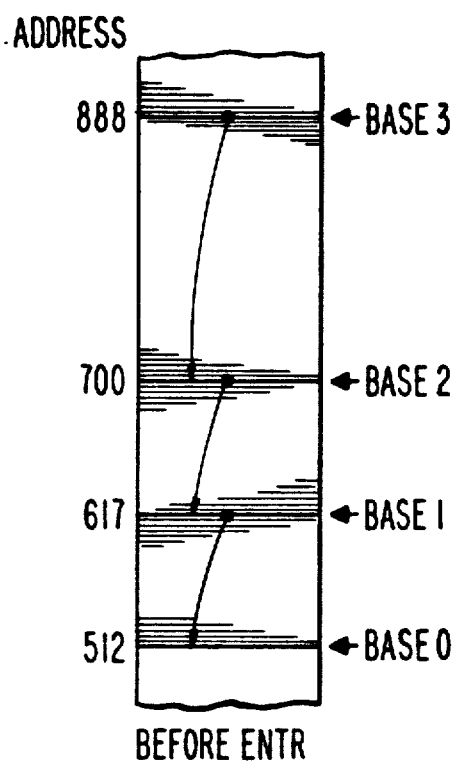

A data stack as might exist in one of memory modules 12 of FIG. 1 is illustrated in FIG. 2A and consists of four activation records at lexical levels 0-3, where the value of the topmost lexical level is stored in a lexical level register in a corresponding processor. The actual addresses in memory of the respective bases of the activation records are shown in 2A and these addresses are stored in the display registers of the corresponding processor in a manner illustrated in FIG. 2B.

Figure 2C:
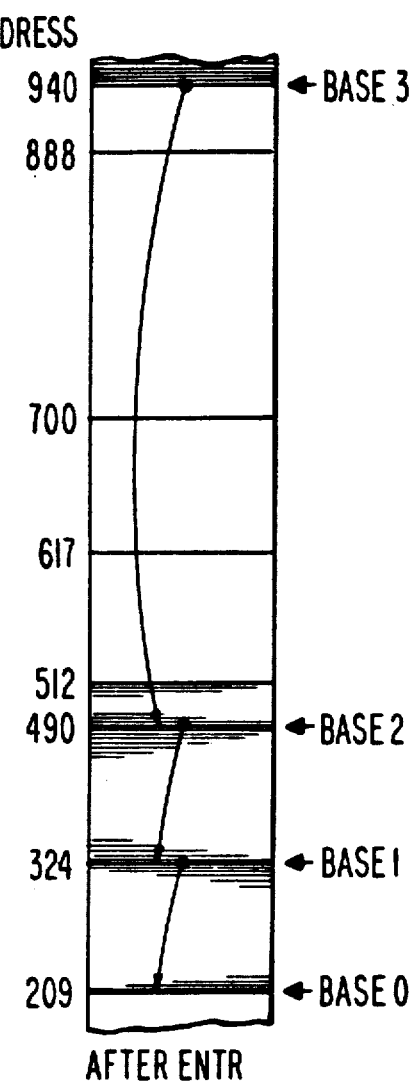
Figure 2B:
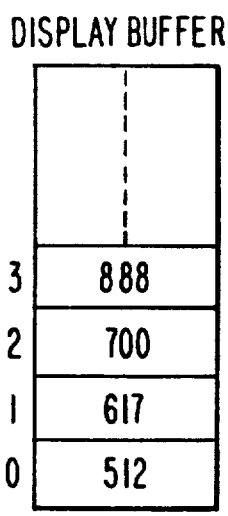
Figure 2D:
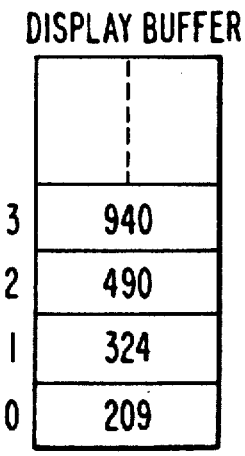

Activation records are created by the execution of a procedure entry operator by the processor. Thus, for the purposes of illustration, FIG. 2C illustrates that the processor is now working in a different stack or portion of memory. As a result, the display registers of a particular processor have had to be updated and this update is shown by the new contents of the display registers as shown in FIG. 2D.

Referring back to FIG. 1, the task control processor 13 is designed to relieve the master control program of many of its most time consuming functions. In the prior art, the respective central processors 10 of FIG. 1 would be running various programs or processes. That is to say, they would be operating in different stacks in memory. If, for example, a particular processor executed a branch instruction which called for a branch to another task, it would notify the master control program which would then initiate the required process and cause the requesting process to be put in a waiting state. When the required process has been finished, the master control program would then notify the requesting process that the required process was finished and the requesting process would then be reactivated. Other examples of master control program functions have been discussed above, such as handling of external interrupts and initialization of input-output operations. In addition, the master control program in prior art systems would handle the scheduling of various tasks for execution by the various processors 10 of FIG. 1 according to which processes had the highest priority.

Figure 3:
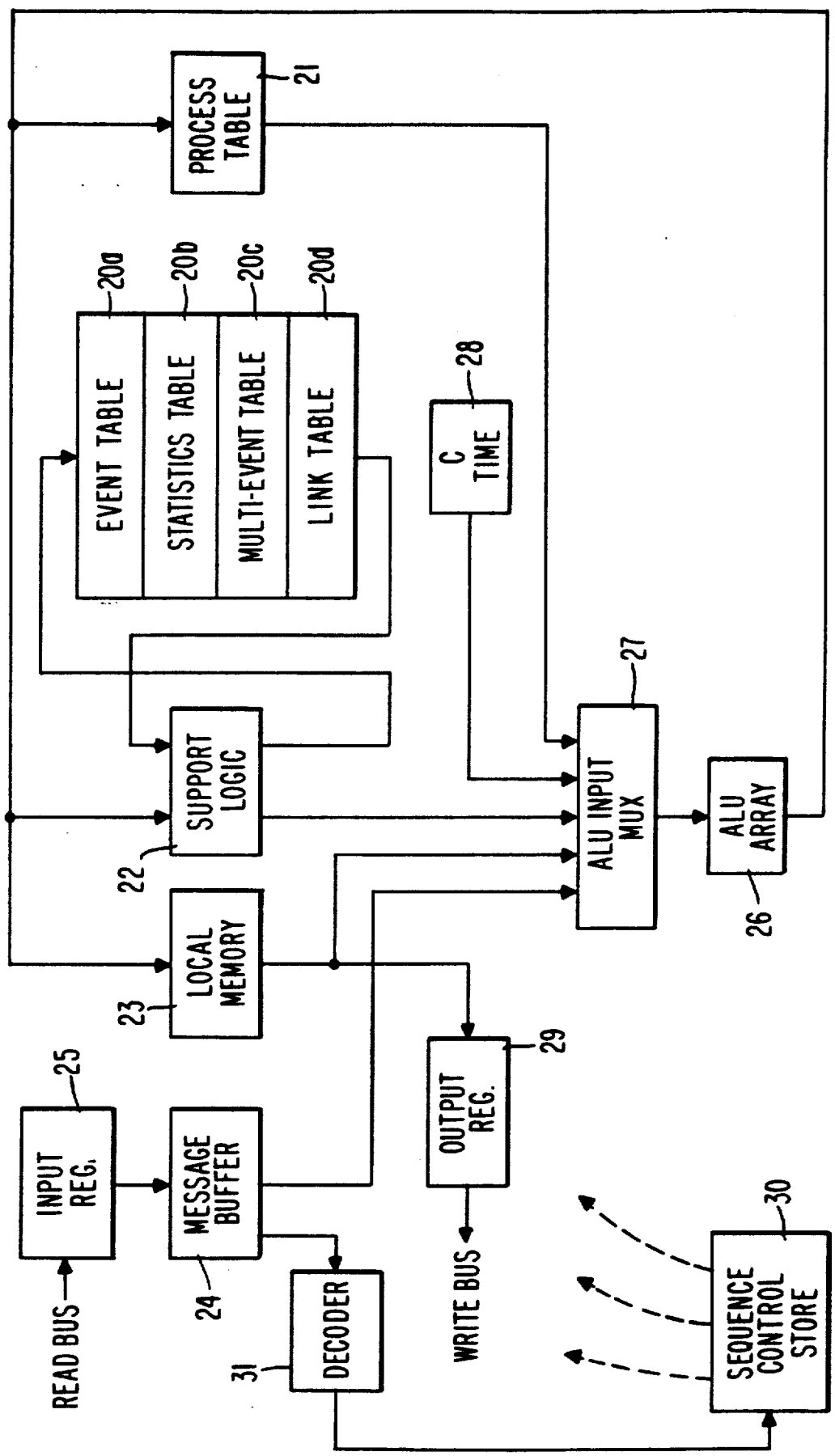

The task control processor 13 of FIG. 1 is illustrated in more detail in FIG. 3. The two principal functional elements shown therein are process table 21 and event table 20a. Process table 21 and process statistics table 20b contain the information as to the status of all tasks or processes scheduled to be run on the system of FIG. 1. In the described embodiment of the present invention, there can be 4 K such tasks or processes running on the system at any one point in time.

The status information of the processes in process table 21 are arranged as a queue or a linked list of processes according to the priority of the processes involved. During the operation of the system of FIG. 1, certain processes may be completed and removed from the linked list within process table 21 and new processes may be inserted. In each case, the task control processor of FIG. 3 computes the new priority ratings and rearranges the linked list. In this manner, the highest priority process is always ready to be assigned to an available processor 10 of FIG. 1 as required.

It should be evident from the description thus far that the terms "task," "process" and "stack" are used synonymously where a stack is a natural physical location in main memory and the respective tasks or processes are independent of one another and occupy the corresponding stack space. Similarly, the terms "stack number," "task number" and "process number" are used synonymously and are the actual addresses to process table 21 of FIG. 3 of the corresponding process status information.

Event table 20a is employed to contain information as to the status of various event designations called for by processes running on the system. In the described embodiment of the present invention, there may be a maximum of 512 K such events being utilized at any one time. When a process being executed by a particular processor 10 of FIG. 1 requires an event designation, it requests the allocation of such a designation from the task control processor of FIG. 3, which then allocates an unallocated event designation to that process and sends an event token to be placed in main memory on the top of the particular stack whose process requested that event designation. Event table 20a then upgrades the event information to indicate that the event has been allocated. The event token is made up of the event address to event table 20a and also certain coded bits to ensure that one of processors 10 of FIG. 1 does not accidentally create its own event token. Event table 20a is also employed to maintain a linked list of various processes requesting a particular event that has already been allocated and assigns that event to the highest priority process requesting that event when the event is freed or liberated by its owning process.

As was indicated above, an event designation does not specify the particular function for which the event was allocated. This is done by the requesting process. Event table 20a serves the purpose of maintaining the status of the event, e.g., whether it is available for allocation, whether it has occurred, what processes are waiting on it, and so forth.

In addition to event table 20a, multi-event table 20c is provided to contain entries of sets of associated events (herein referred to as multi-event entries) called for by the different processes and the entry designation (address) becomes the token placed on top of the process stack instead of a single event token or a designation. The purpose of this and its consequences are more thoroughly described below.

Continuing on with a description of FIG. 3, support logic 22 is employed to insert information fields into event table 20a, statistics table 20b and link table 20d as well as to extract fields therefrom as required. Local memory 23 serves as an output buffer and also maintains a processor table which indicates which processes are currently running on the respective processors 10 of FIG. 1.

Message transmission to the other processors of FIG. 1 are by way of memory controller 12a from output register 29 of FIG. 3. Messages are received from controller 12a by way of input register 25 to message buffer 24. As indicated in FIG. 3, the various functional units thus described have inputs to arithmetic logic unit module 26 by way of arithmetic logic unit input multiplexer 27. Arithmetic logic unit module 26 is employed to compute process priorities as described above and also to form messages for transmission to the other processors of the system. Clock timer 28 supplies real time clock values to arithmetic logic module 26 to aid in the computation of how long a particular process in a wait state has been waiting as compared to the maximum amount of time it can wait before its execution must be reactivated (as well as statistics, and task scheduling algorithms).

All of the functional units of FIG. 3 are under the control of sequence control store 30 and are activated by the receipt of an external processor request by message buffer 24, where the request command is decoded by control store 30.

When the command received from the external processor is either a WAIT, PROCURE, or RECEIVE command, the special purpose processor of the present invention responds by transmitting to that processor a MOVE-STACK command which causes the processor to begin executing a different process assigned by the special purpose processor of the present invention. This command is stored in local memory 23 of FIG. 3 and is transmitted to the processor which made the initial request along with the process number or stack number of the next available process having the highest priority for execution as will be more thoroughly described below.

The task control processor of FIG. 3 serves to maintain the status of the various processes and control the execution of those processes by the respective central processors 10 of FIG. 1. A process may be in one of four main states as follows:

Alive—currently executing on a processor;
Ready—in a suitable state to run when a processor becomes available;
Waiting—cannot be run until some event occurs; and
Selected—a main processor has been instructed to move to this process stack and acknowledge to this command has yet to be received by the task control processor.

In addition, the task control processor maintains two further state bits for each process, namely "scheduled" and "blocked." A scheduled process is one which is included in the scheduling mechanism and unscheduled when the process is to be removed from that mechanism. The four states listed above apply only to scheduled processes. A blocked process is one which will not be scheduled for execution on a processor until such time as it becomes "unblocked."

Process table 21 and statistics table 20b of FIG. 3 maintain the following information for each process in the system: the process current state, i.e., ready waiting, etc.; the process priority; accumulated processor and ready time; the processors to which the process may be assigned; maximum permitted processor time; and the class of service of the process.

The process class is used to implement a resource sharing scheme between different groups of processes. The task control processor of FIG. 3 also maintains system wide statistics on processor utilization and processor time consumed by processes of different classes. These process attributes may be set and read by software at any time, regardless of whether the process is currently under the control of the task control processor.

The task control process or FIG. 3 responds to process commands from the respective main processor. A SET-PRIORITY command changes the priority of a designated stack to a supplied value. A SET-CLASS command sets the statistics class of the designated stack. A SET-PROCESSOR command marks the designated stack as being executable only on a designated main processor. The INSERT command causes the designated stack to be included in the scheduling mechanism and the REMOVE command causes the designated stack to be deleted from the scheduling mechanism. The above commands are merely examples of the types of commands issued to the task control processor to control process scheduling and many other commands are employed but their description is not required here.

The various commands described above are initiated by the main processors when they decode specific instructions in the code stream of the process that the respective processor is then executing. The same is true of the request for event allocation in processing. It will be remembered that when a given process or task requires an event to be allocated, this can only be communicated to the task control processor by one of the main processors executing that process.

The general nature of an event has been well described above. Access to an event is obtained by a particular process upon execution of an ALLOCATE command which, in return, requests the event from the task control processor of FIG. 3. The task control processor then generates an event token for an available event selected from event table 20a, which token is placed on top of the stack of the requesting process. Often the communications between the task control processor and the requesting processor are in terms of these event tokens.

In addition to the ALLOCATE function, other functions performed by the task control processor in response to a received command, include DEALLOCATE which causes the designated event to be returned to the pool of available events and there may be other processes which are either waiting on or attempting to procure the event in which case the requesting processor will be notified. The PROCURE command results in an attempt to procure a designated event on behalf of the process which is currently executing on the requesting processor. If the event is available, it will be marked as unavailable, the owner will be designated as the stack number is currently executing. If the event is unavailable, the processor will be rescheduled.

The LIBERATE command causes the task control processor to pass ownership of the designated event to the highest priority process which has attempted to procure it. If no such process exists, the event is marked as available.

The SIMPLE-WAIT command suspends execution of the process currently executing on the requesting processor until either a time limit has expired or one of a set of events has happened.

The CAUSE command will "awaken" all processes which are currently waiting on a designated event. The event will be marked as happened unless either a reset option is used or there is some stack performing a particular function upon the event, in which case it will be left in the not-happened state. If the event is available and has contenders, the highest priority contender will be given ownership of the event.

The SET command marks the designated event as happened without reactivating any process which may be waiting on it.

When a process requires a multi-event entry in order to relate a set of events to it, it requests the allocation of such a designation from the task control processor of FIG. 3, which then allocates an unallocated multi-event designation and sends a multi-event token to be placed in main memory on the top of the particular stack whose process requested that multi-event designation. Multi-event table 20c is then upgraded to indicate that the multi-event entry has been allocated. The multi-event token, just as the event tokens, is made up of the multi-event address to multi-event table 20c and also certain coded bits to ensure that one of the processors 10 of FIG. 1 does not accidentally create its own multi-event token. Multi-event table 20c is also employed to maintain a pointer to the head of a linked list of arrived events which are related to the multi-event entry, so that the first of the arrived events may be returned to a process which receives on the multi-event entry.

Access to a multi-event entry is obtained by a similar method to that for events, which occurs by way of the ALLOCATE-MULTI-EVENT command, in response to which the task control processor then generates a multi-event token for an unallocated multi-event entry selected from multi-event table 20c, which token is placed on top of the stack of the requesting process.

Other multi-event commands include the inverse to the aforementioned command, which is the DEALLOCATE-MULTI-EVENT command, in response to which the task control processor returns the designated multi-event entry to the pool of unallocated multi-event entries.

When a CAUSE command is for an inscribed event, if the event is not already arrived at its associated multi-event entry, it is now inserted at the tail of the arrived queue for the associated multi-event entry, and marked arrived.

The RECEIVE command suspends execution of the requesting process until an event associated with the multi-event entry by an INSCRIBE command, is caused, or until the time limit specified with the RECEIVE command is expired.

The INSCRIBE command associates a designated event with a particular designated multi-event entry, while simultaneously assigning a "signature" to the event. Upon coming to the head of the arrived queue for the multi-event entry, this signature will be returned to a process receiving on the multi-event entry, should the multi-event entry be received upon.

ERASE is the inverse to INSCRIBE. The event designated is removed from its associated multi-event entry and marked as not inscribed.

SET COUNTED and RESET COUNTED commands control the counted state of the designated event. If an event is counted, and it is already arrived at a multi-event entry when it is caused, then the event retains its original position in the arrived queue, but it also has its arrival count incremented. When the event signature is returned in response to a RECEIVE, the events arrival count is decremented and the event is linked at the tail of the arrived queue for the multi-event entry, providing the new arrival count is non-zero. If the event is not counted, and it is already arrived, and is caused, then the event simply retains its original position in the arrived queue. There is no arrival count associated with an event which is not counted.

Three other multi-event commands return various information associated with multi-event entries and inscribed events. These are GET MULTI-EVENT STATE, GET EVENT SIGNATURE, and GET EVENT MULTI-EVENT ENTRY.

All of the tables of FIG. 3 are initialized whenever a halt-load is performed on the system. After that the tables are not reloaded but are modified from time to time depending upon the commands the task control processor is executing.

The assignment of the various processor 10 of FIG. 1 to the various processes or stacks in main memory depends on the commands sent to the respective processors under control of control store 30 of FIG. 3 which causes the respective processors to begin execution in various designated stacks. Thereafter, control store 30 of FIG. 3 will cause individual processors to be rescheduled (moved to another stack) primarily when that processor has executed a wait-on-event command, a procure command, or a receive command as was discussed above. Control store 30 of FIG. 3 will also cause a processor to move to another stack whenever it determines that it has been operating in its current stack for more than a prescribed time.

DETAILED DESCRIPTION OF THE INVENTION

FIG. 4 is a representation of the organization of process table 21 of FIG. 3 which is a static RAM with a capacity of 16K word locations of 17 bits each. This RAM is divided into 4K four-word blocks so as to provide the information required for the scheduling and manipulation of information for 4K processes as was described above. Each four-word block is addressed by a 12 bit process number, as was described above, which is supplied with 2 extra bits to select which of the words is to be addressed in the particular four-word block.

Figures 4A, 4B:
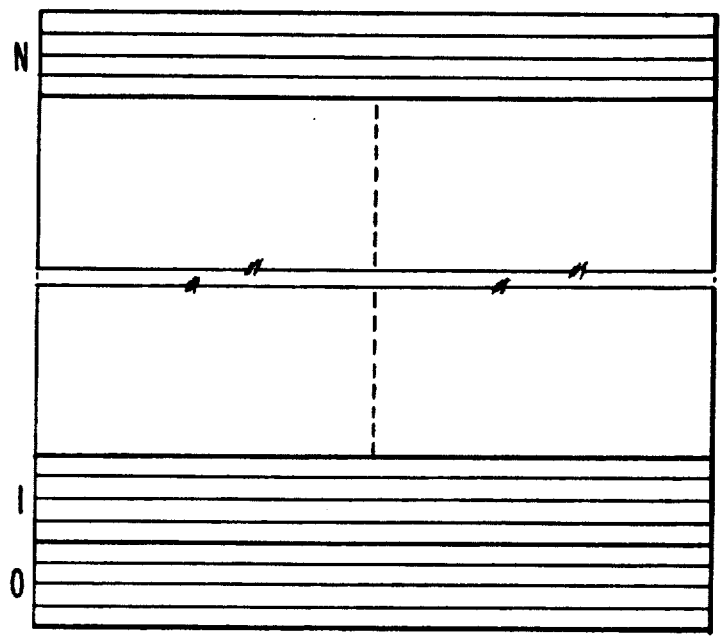

FIG. 4B illustrates the format of one of the four-word blocks in FIG. 4A.

In WORD-0 of FIG. 4B, bit 16 is the selectable bit which indicates that the process is a candidate for selection as head of the ready queue (which is described below) The process must be scheduled and ready and not blocked to be in this state. Bits 15–12 identify the statistics class to which class the current process belongs. Bits 11–0 are the ready queue forward link, which is used when chaining through the ready queue in order of descending priority. That is to say, bits 11–0 are the 12 bit process number or address to the process table of the next lower priority process in the linked list of such processes.

Word-1 of FIG. 4 is similar to WORD-0 except that bits 11–0 now represent the ready queue reverse link or the process number of the next highest priority process in the linked list of processes scheduled on the system.

In WORD-2 of FIG. 4B, bit 16, when set, indicates that this process is at the head of the ready queue for its particular processor designation as will be described in relation to WORD-3. Bits 15–8 of WORD-2 are the most significant portion of the total priority of the process which priority is setable by some processor task and is manipulated by the task control processor of the present invention. Bits 7–0 represent the least significant portion of the total priority of the process and are manipulated by the scheduling algorithm employed by the task control processor of the present invention.

In WORD-3 of FIG. 4B, bit 16, when set, indicates whether or not the current process has been scheduled on the system. Bits 15–8 represent the original base priority of the process. This is the lowest base priority which the process would fall back to when lock contention conditions are resolved. Bits 7 and 6 indicate the type of processor upon which the current process is to be run (namely whether the processor is a main processor 10 of FIG. 1 or I/O processor 11 of FIG. 1, or a future processor type not yet implemented). Bits 5 and 4 represent the process state which may be Waiting, Ready, Selected (as was described above), or Alive. Bit 3, when set, indicates that the process has been "blocked" and task control processor will not schedule it for execution on a processor. Bit 2, when set, indicates that this process is to be interrupted on the next move stack command telling a processor to move to this stack number.

Event table 20a of FIG. 3 contains storage locations of the status of 512K events. Like process table 21, each storage location in event table 20a is made up of a four-word block. The general formats of the respective words are illustrated in FIGS. 5A–D. Each block in the event table is addressed by an event number which is part of the event token, as was described above, along with two other bits which specify which of the four words is to be addressed. Each of the four words is 52 bits in width.

Figure 5A:
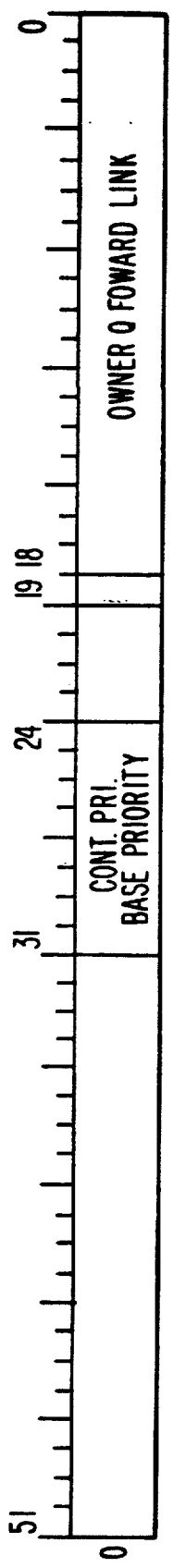

FIG. 5A represents the general format of WORD-0. As illustrated therein, there are two principal fields that are relevant to this disclosure. Bits 31-24 indicate the priority of the highest priority process which is contending or trying to procure this event while it is owned by some other process for reasons that were described above. Bits 18-0 contain the event number of the next lower priority event owned by the process which owns the current event. That is to say, this field is a forward link in a queue of all events currently owned by the owner of the current event.

Figure 5B:
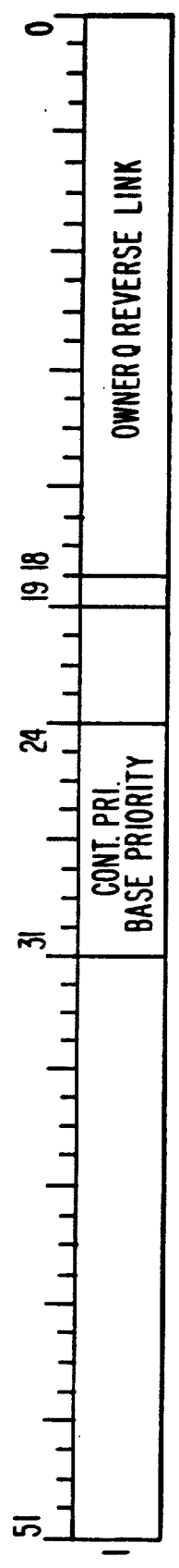

FIG. 5B represents the general format of WORD-1 which is similar to that of WORD-0 except that bits 18-0 now represent the owner queue reverse link or the event number of the next highest priority event owned by the owner of the current event.

Figure 5C:
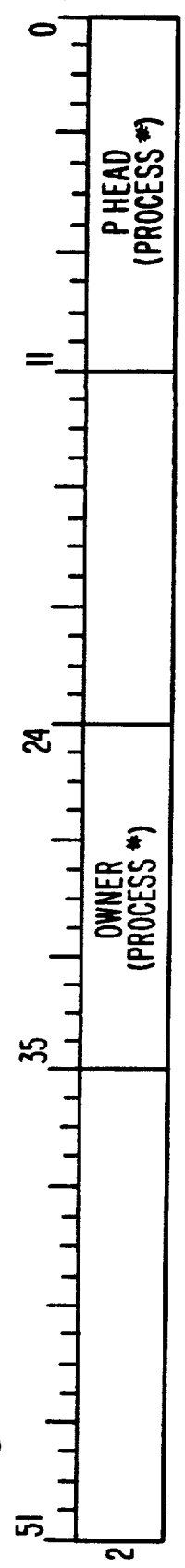

FIG. 5C generally represents the format of WORD-2 which has two fields that are of particular interest here. Bits 35-24 contain the number of the current owning process. Bits 11-0 also represent a process number which represents the highest priority process which is attempting to procure ownership of the current event.

Figure 5D:
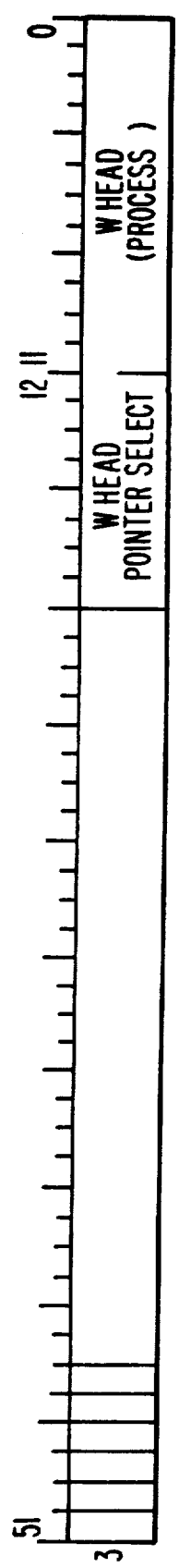

FIG. 5D is a general format of WORD-3. Bit 51 of this word, when set, indicates that the current event has been allocated. Bit 50, when set, indicates that the event is available. Bit 49 is a special bit which, when set, indicates that ownership of that event has been obtained by a particular authorized process and taken away from all other processes that had had ownership. Bit 48, when set, indicates that the event has happened or occurred. Bit 47, when set, indicates that there are contenders or processes attempting to procure this event. Bit 46, when set, indicates that there are processes waiting for this event to happen. There are two other fields or sets of bits which are of significance to this disclosure. Bit 19-0 are a pointer or link to a list of processes which are waiting for the event to happen, which list is in link table 20d of FIG. 3. Bits 11-0 of this link are the process number of the first process in the list.

WORDS 0, 1 and 2, as described above, are basically concerned with processes waiting to procure events while WORD-3 is basically concerned with processes which are waiting on events. In regard to processes waiting on an event, it should be emphasized that only one process may own an event, or a plurality of events, at any one time. However, a number of processes can be waiting on a given event even though they don't own it. The reason for this is in the nature of the block-structured programming languages employed in the preferred embodiment of the present invention, as was discussed above in relation to FIGS. 2A-D. That is to say, with such block-structured languages, any process, although independent, is part of a hierarchy of processes. Thus, when a given process requests and is allocated an event, it notifies its parent process that it owns that event and has assigned a function to it and the parent process in turn notifies other sibling processes that the particular event has been allocated and assigned a function. Any of the sibling processes requiring that event are then placed in a waiting state until the event occurs.

Figure 6:
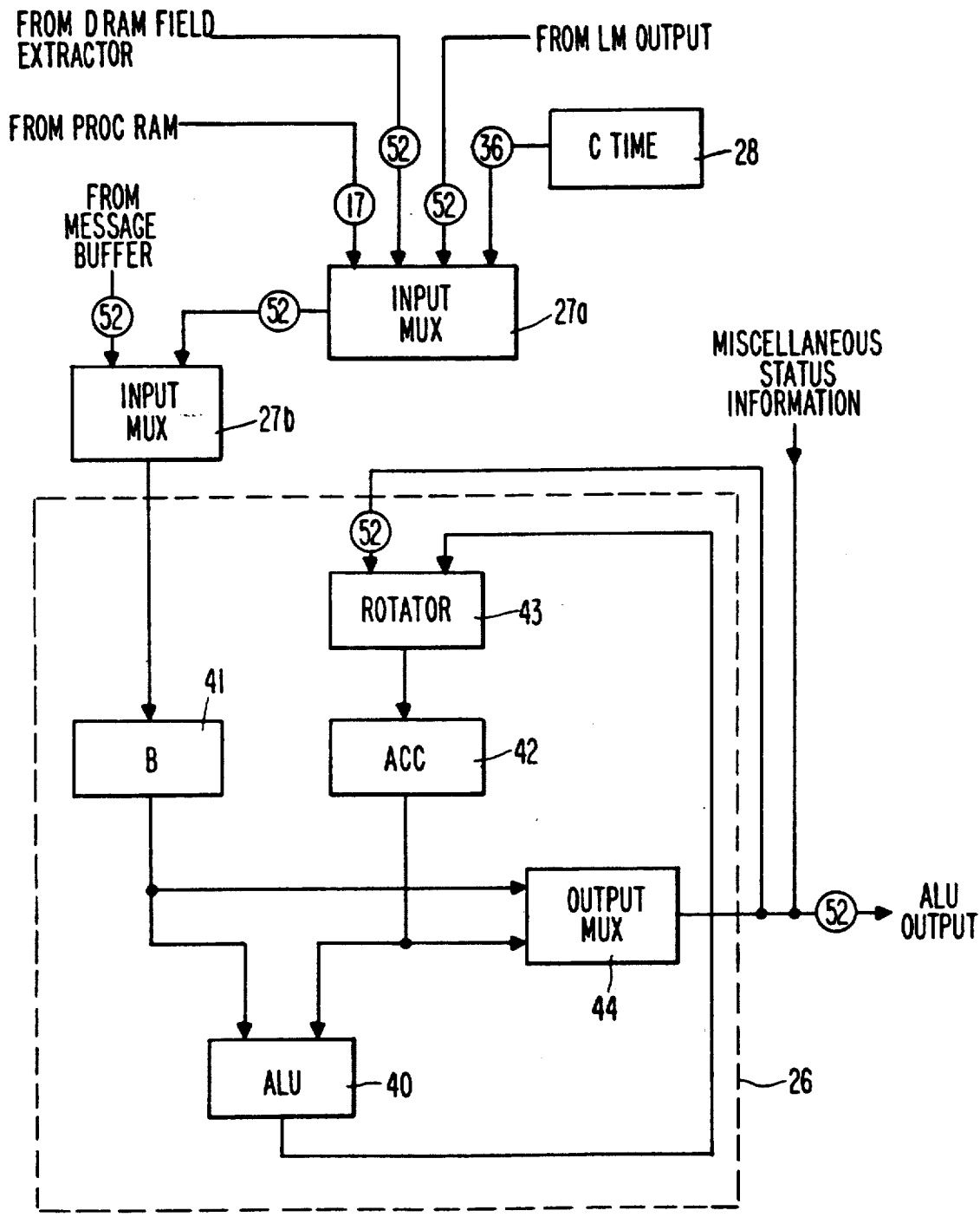
FIG. 6 is a schematic diagram illustrating the inputs to the arithmetic logic unit (ALU) of the processor of the present invention.

FIG. 6 is a more detailed schematic diagram of arithmetic logic unit module 26 and arithmetic logic unit input multiplexer 27 of FIG. 3. In FIG. 6, arithmetic logic unit module 26 includes arithmetic logic unit 40 which receives inputs from B register 41 and accumulator 42. The output of arithmetic logic unit 40 is to rotator 43 which is a shifting mechanism that may shift left end around either eight bits or one bit. The output of rotator 43 is to accumulator 42. The output of B register 41 and accumulator 42 are also supplied to output multiplexer 44. The input to arithmetic logic unit module 26 is by way of the series of input multiplexers 27a and 27b which together form arithmetic logic unit input multiplexer 27 of FIG. 3. The inputs to these two multiplexers were described above in regard to FIG. 3.

Figure 7:
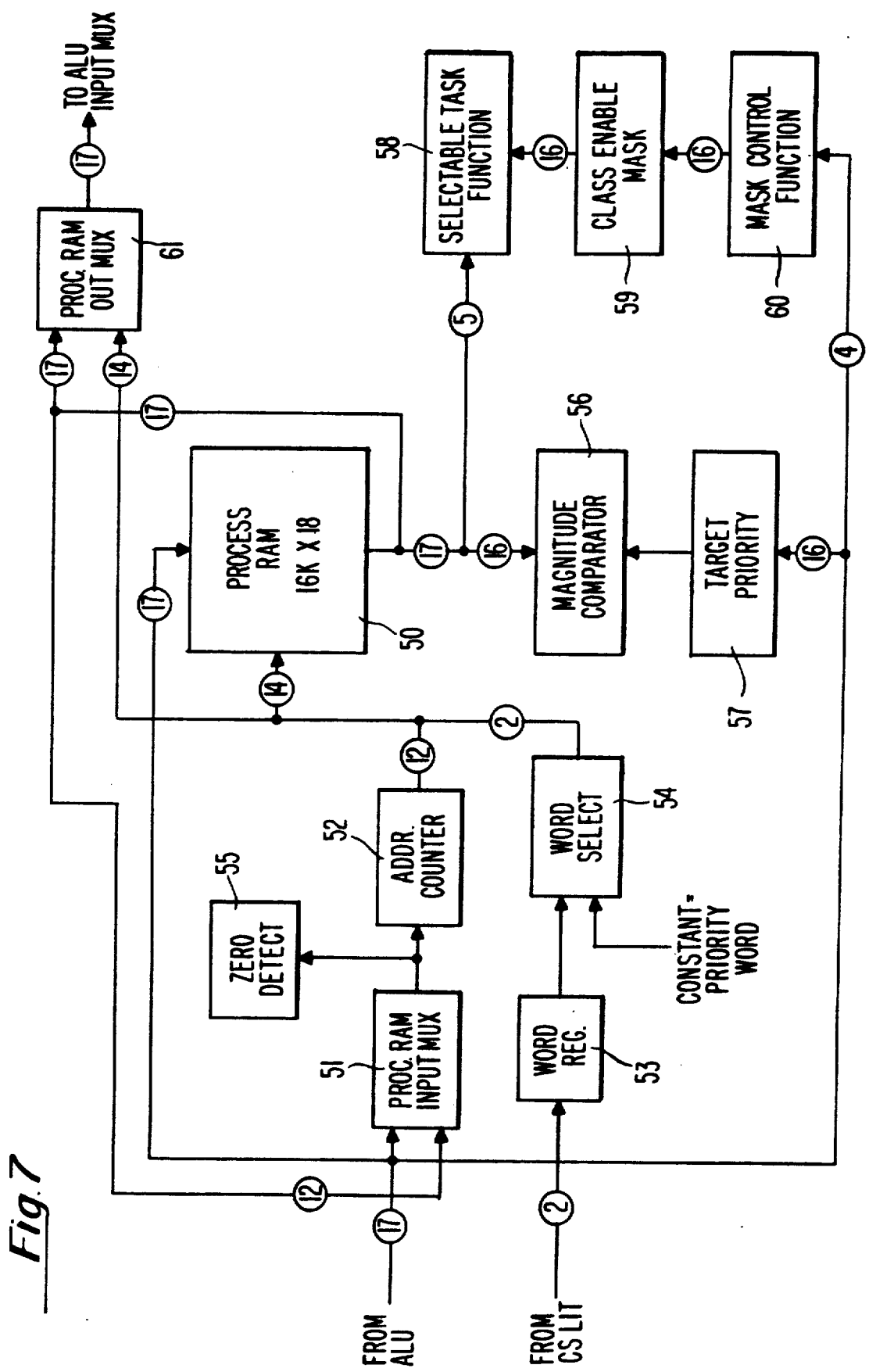
FIG. 7 is a schematic diagram illustrating the inputs and outputs of the process table of the present invention.

FIG. 7 illustrates the input and output logic for process table 21 of FIG. 3. In FIG. 7, the actual process table is process RAM 50 which is a 16K by 18 bits (including parity) static random access memory. Addresses and data are received from arithmetic logic unit module 26 of FIG. 3 with the addresses going directly to process RAM input multiplexer 51 and the data going directly to the input of process RAM 50. Process RAM input multiplexer 51 selects either the address from the arithmetic logic unit module or from the output of process RAM 50 which address is a 12 bit process number as was described above. The selected address is then sent to address counter 52 for addressing process RAM 50. Two bits can also be received from sequence control store 30 of FIG. 3 by word register 53 of FIG. 7. As was explained above, these two bits specify which word in a particular process word-block is to be selected. These two bits may also come from a constant which selects the priority word of a particular process block and word select multiplexer 54 selects between either the constant or the contents of word register 53. These two bits are then added to the 12 bit output of address counter 12 to create a 14 bit address to process RAM 50.

Magnitude comparator 56 serves to compare the priority of the current process block being addressed in process RAM 50 with a target priority as received by target priority register 57 from arithmetic logic unit module 26 of FIG. 3. This target priority represents the priority of a task to be inserted in the linked list of tasks being maintained in process RAM 50.

Selectable task function unit 58 of FIG. 7 serves to compare the class of each of the processes in process RAM 50 with the contents of class enable mask 59 to see which of the current processes are enabled for execution on an available processor, in which case sequence control store 30 of FIG. 3 is notified by selectable task function 58. Mask control function unit 60 serves to set various bits in class enable mask 59 to indicate which classes can be run on currently available processors.

Figure 8:
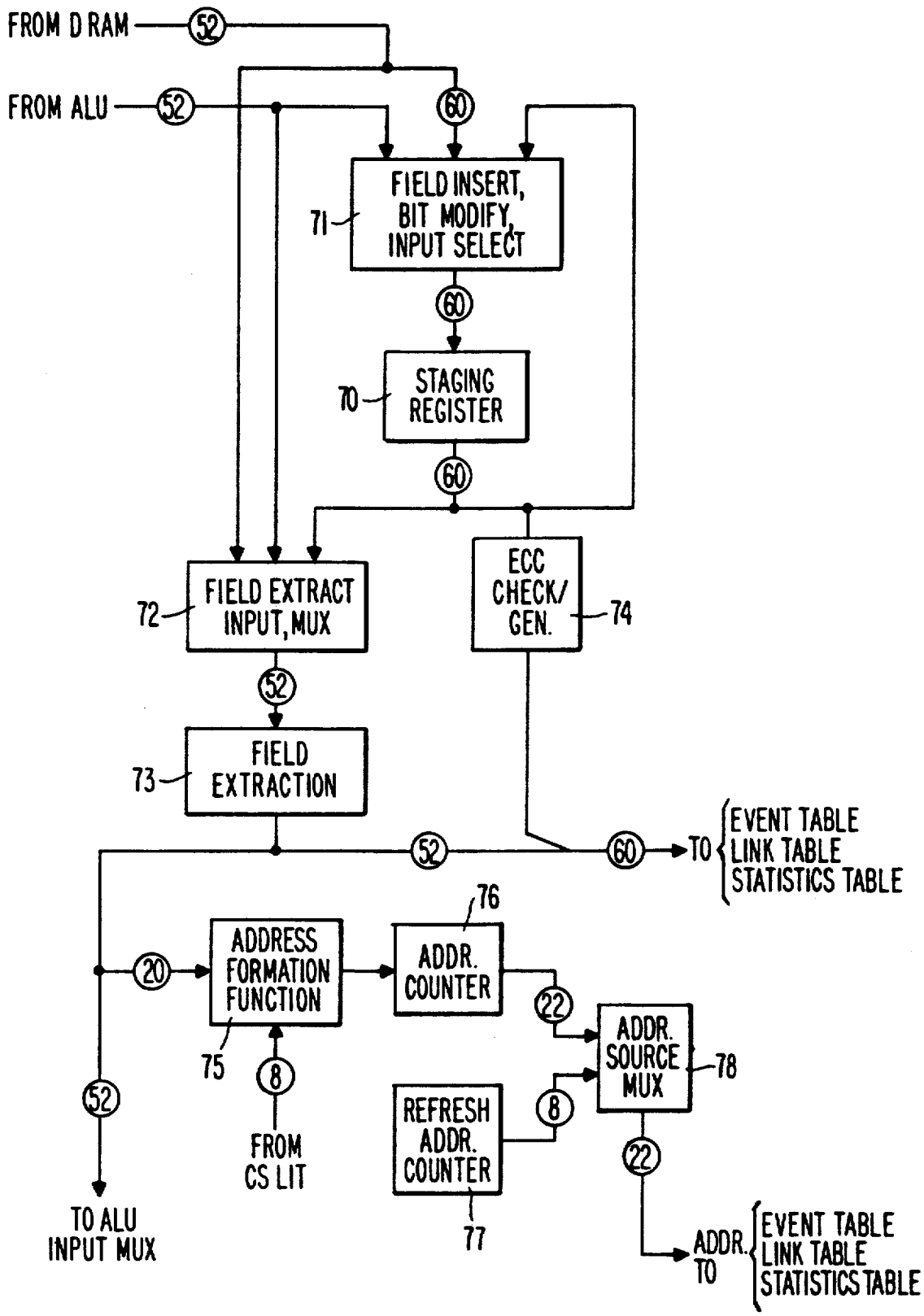
FIG. 8 is a schematic diagram of the event table support logic.

FIG. 8 illustrates in more detail support logic 22 of FIG. 3 for receiving data for input into and fetching data from event table 20a, statistics table 20b, multi-event table 20c, and link table 20d of FIG. 3. All data transfers into and out of those tables is by way of staging register 70 which can receive data from the arithmetic logic unit module 26 of FIG. 3 or from respective tables themselves which are formed of dynamic RAMs. Staging register 70 can also receive data from its output and these three inputs are selected by input select unit 71. The data remains in staging register 70 for one clock period while its parity or error correction code (ECC) is checked by check/generator 74. The data may then have fields extracted from it by field extraction unit 73 for transmission back to the arithmetic logic unit module or the entire output data from staging register 70 can be combined with a parity bit from check/generator 74 for transmission to the respective event table, multi-event table, link table or statistics table. The input to field extraction unit 73 is selected by field extract input multiplexer 72.

Addresses for the respective tables are generated by address formation function unit 75 by receiving a 20 bit field from field extraction unit 73. An 8 bit literal from sequence control store 30 of FIG. 3 informs address formation function unit 75 of the particular table to be addressed and formation function unit 75 then forms the appropriate address for transmission to address counter 76 from which it is sent to the respective table by address source multiplexer 78 which may also select an address from refresh address counter 77 when the dynamic RAMS of tables 20a, 20b, 20c, and 20d of FIG. 3 are being refreshed.

FIG. 9A is a diagram of how ownership is passed from one process to the next lowest process waiting to procure an event. As shown therein, when an event becomes available having been freed by its owning process, the P-head field of WORD-2 of the particular event block is used as a pointer to link table 20d of FIG. 3 where the process number of the next lower priority process requesting ownership resides. The event is then assigned this process as owner and this process is then made ready for the next available processor 10 of FIG. 1. When that processor becomes available, it is given instruction to move to the stack number of the now owning process. When the event again becomes available, the above procedure is then repeated.

Figure 9B:
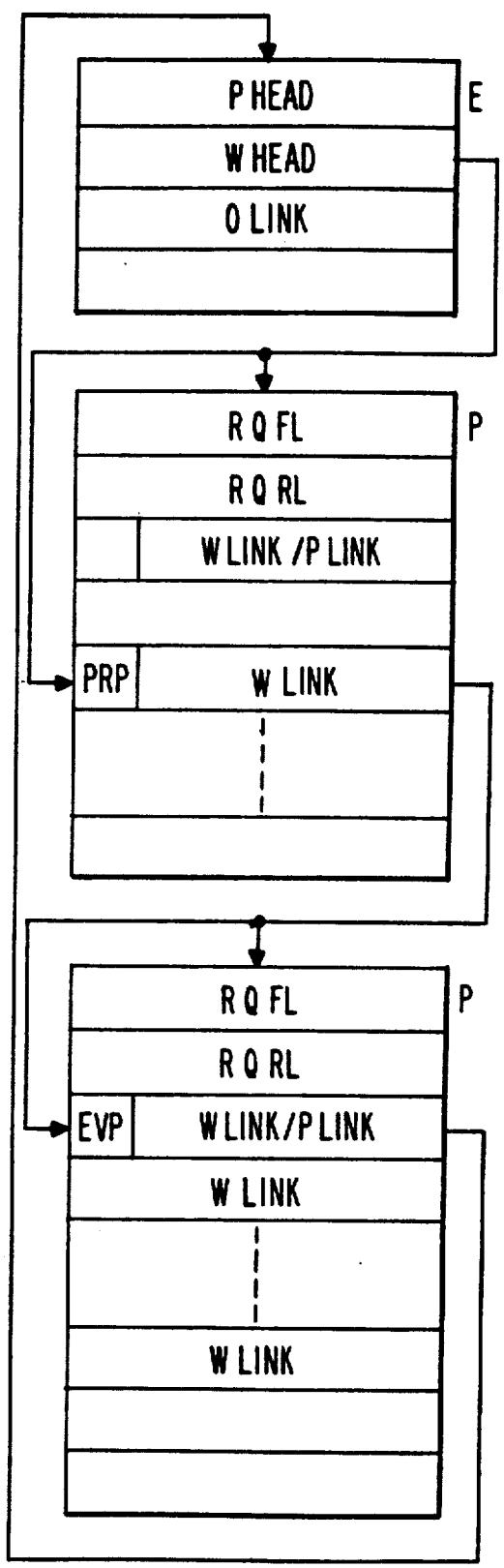

FIG. 9B illustrates how link table 20d of FIG. 3 is employed to link processes waiting on this same event. As shown therein, when an event has occurred and its "happened" bit has been set, (due to the receipt of a CAUSE command received by the task control processor of FIG. 3), the W-head of WORD-3 of the particular event block is employed to point both to the particular process block in process table 21 and also to the process link in link table 20d and this action ripples through the link table and the process table such that all processes waiting on that event are made ready for the next available processor 10 of FIG. 1.

The formats of inscribed events differ from those of uninscribed events as FIG. 10 illustrates. These words are actually the same words in either case but are interpreted differently. Fields used in uninscribed events for locking functions such as PROCURE and LIBERATE, are used in inscribed events for multi-event functions. Therefore, the use of multi-event and locking functions on events is mutually exclusive, and any attempt to use an event the incorrect way will immediately be recognized by the TCP and reported as an error. Note however, that all state associated with WAIT and CAUSE, functions simultaneously with either multi-event or locking functions.

Figure 10A:
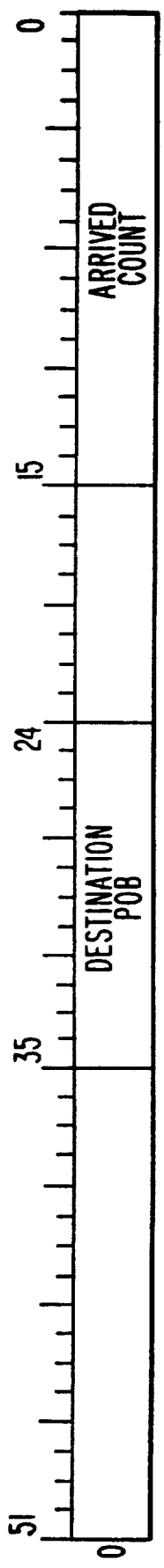

FIG. 10A represents the general format of WORD-0. As illustrated, there are two fields within this word. The DESTINATION multi-event field in bits 35..24 indicates the multi-event number of the multi-event entry to which this event has been associated, when it was inscribed. The ARRIVED COUNT field in bits 15..0 is the arrival count which is used only for counted events. It is an error condition if the arrival count is currently at its maximum value, and the event is caused.

Figure 10B:
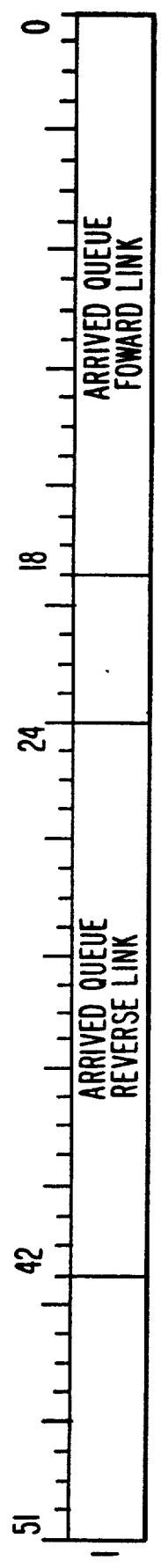

WORD-1 is illustrated in FIG. 10B. The two fields of WORD-1 are used for linking the event into the arrived queue of its DESTINATION multi-event entry (see WORD-0) when the event is caused. The FORWARD-LINK in bits 18–0 is the link which points down toward the next event in the queue, while the REVERSE LINK in bits 42–24 points upward in the queue toward the head. The use of both forward and reverse links makes abnormal removal of the event from the arrival queue easier.

Figure 10C:
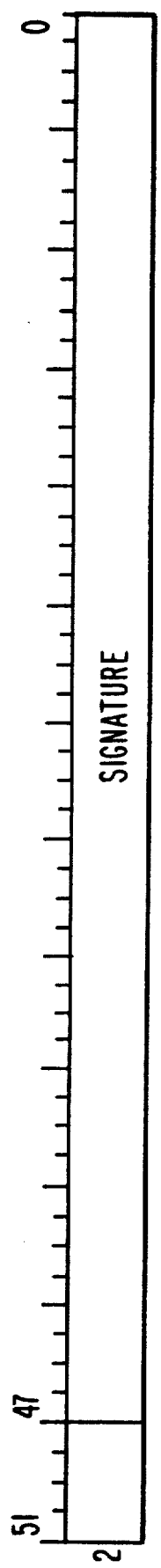

As we can see from FIG. 10C, WORD-2 is used entirely for the SIGNATURE in bits 47–0, which was associated with the event when the event was INSCRIBED. It provides a designation of what the event actually is so that the requesting process can keep track of it.

Figure 10D:
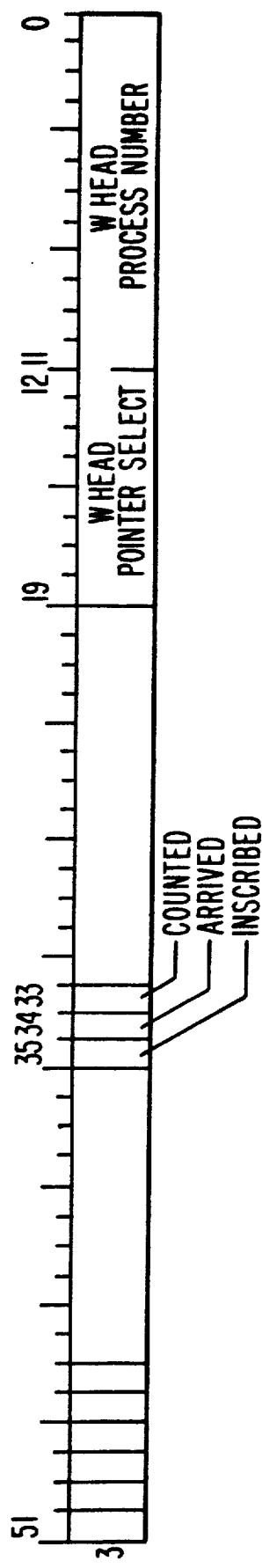

FIG. 10D, illustrating event WORD-3 for an inscribed event, is identical to FIG. 5D, which illustrates event WORD-3 for an uninscribed event. All bits not related to multi-event entries were previously described in the description for FIG. 5D. There are three bits within WORD-3 which are related to multi-event entries, i.e. bits 33, 34 and 35.

Bit 35 is the INSCRIBED bit, set when an INSCRIBE command designates this event to be inscribed. If the INSCRIBED bit is off, none of the multi-event related fields in an event have any meaning, instead the event information must be interpreted as information associated with locking functions, as described earlier. If the INSCRIBED bit is on, then none of the fields associated with locking functions have any meaning, and the event information must be interpreted as information associated with multi-event entries.

BIT 34 of WORD-3 is the ARRIVED bit, which when set indicates that the event is currently arrived at a multi-event entry, in which case it is currently entered into the arrived queue for its DESTINATION multi-event entry.

Bit 33 of WORD-3 is the COUNTED bit, which is controlled by the RESET COUNTED and SET COUNTED commands, and indicates whether the event is counted or not.

As illustrated in FIG. 3, the multi-event table, item 20c of FIG. 3, is actually stored as a portion of the process statistics table, item 20b of FIG. 3. This is possible because the process of the present invention does not fully utilize all of the 256 words available to each task, for process statistics. Just as there is a maximum of 4K tasks, there is also a maximum of 4K multi-event entries, therefore, we utilize a simple mapping scheme which associates each multi-event entry with the spare words of a particular process within the process statistics table. Each multi-event entry requires three 52-bit words of associated state, therefore, we use words 252, 253, and 254 of the appropriate process statistics task to contain words 0, 1, and 2 of multi-event state.

The general formats of the respective words of the multi-event table are illustrated in FIGS. 11A–C.

FIG. 11A illustrates the general format of WORD-0. As illustrated therein, the first bit within WORD-0 of importance is bit-47, the ALLOCATED bit, which, if set indicates that the multi-event entry has been allocated by the TCP. If not set, this indicates that the multi-event entry is currently linked into the available multi-event list.

Bit-46 of multi-event WORD-0 is the ARRIVED bit, which indicates that the multi-event entry has at least one entry in its arrived queue.

Bit-45 of multi-event WORD-0 is the RECEIVING bit, which indicates that the multi-event entry is currently being received upon by the RECEIVING PRO- CESS, which is identified in bits 11-0 of multi-event WORD-0.

As illustrated in FIG. 11B, WORD-1 is used exclusively for the ATTACHED COUNT, which is stored in bits 11-0. The ATTACHED COUNT is a count of the number of events currently associated with this multi-event entry as their DESTINATION multi-event entry, by a previous INSCRIBE command.

WORD-2 of the multi-event table, illustrated in FIG. 11C, contains the head and tail pointers to the arrived queue associated with this multi-event entry. The HEAD POINTER is contained in bits 18-0 and points to the next event in the arrived queue to be received upon, this event would be the event which has been in the arrived queue the longest. The TAIL POINTER is contained in bits 42-24 and points to the event at the end of the arrived queue, which is the event most recently added to the arrived queue.

FIG. 12 illustrates how events are linked together in the arrived queue and how a receiving task is linked to the multi-event entry. When an inscribed event is caused, the arrived queue TAIL POINTER is employed to locate the last event in the queue, to which the new event is now added by changing the last event arrived queue FORWARD LINK to point to the new event and the TAIL POINTER also to point to the new event. If the multi-event entry was being received on, then the arrived queue must have been empty, otherwise the receiving state is only a transient condition, therefore, in this case, there is no need to queue the event into the arrived queue, we simply employ the MULTI-EVENT RECEIVING PROCESS, and immediately return the events signature to the receiving process. When a task receives upon a multi-event entry, and the multi-event arrived queue is non-empty, the arrived queue head pointer is employed to locate next event to return said events signature, and then delink the event from the arrived queue by changing the arrived queue head pointer to point to the event following this one, as designated by this events arrived queue forward link.

One advantage, among others, of the processor of the present invention is that external interrupts now vanish and the device requesting the interrupt, such as an I/O processor, merely signals the special purpose processor of the present invention that a specific event has occurred by sending a cause command which causes that event to have its status changed to "has occurred."

EPILOGUE

A special purpose processor has been described above for the purpose of off-loading those operating system functions which consume most of the processing time of the various processors in a large data processing system. Specifically, the special purpose processor is adapted to schedule processes or tasks on the various processors as the processors become available, which processes are scheduled according to their assigned priority. The special purpose processor also maintains a multi-event table which is really a table of multi-event designations to be allocated to different processes upon request when the requesting processes (including the operating system) assign a particular function to that multi-event designation. Each of the multi-event designations is then supplied a set of associated event designations by requesting processes, which are to be entered into an arrived queue for the multi-event entry when such event designations are caused by this or another requesting process. The multi-event table is then used to maintain the status of all such allocated multi-event entries and to signal a process receiving on a particular multi-event entry, not only that one of its associated events has been caused, but which of the events was caused first, by way of returning that event's signature, which was assigned to it when it was inscribed.

While but one embodiment of the present invention has been disclosed, it will be apparent to those skilled in the art that variations and modifications may be made therein without departing from the spirit and the scope of the invention as claimed.

What is claimed is:

1. In a processing system having at least one central processor and at least one memory module for storing a plurality of processes to be executed by said at least one processor, which processes require different events to occur before their execution can be completed, a multi-event queuing mechanism comprising:
    input means coupled to said at least one central processor to receive a command to allocate one of an event token and a multi-event token to a process currently being executed;
    event table means coupled to said input means to store status information about various events designated by allocated event tokens including whether that event token has been allocated and whether that event has occurred;
    multi-event table means coupled to said input means and said event table means to store information about various events that have been grouped together designated by allocated multi-event tokens and to form a linked list of such events as each event occurs;
    output means coupled to said event table means, said multi-event table means, and to said at least one central processor for transmission of a requested event token received from said event table means and a requested multi-event token received from said multi-event table means; and
    control means coupled to said input means, output means, event table means, and multi-event table means to respond to said command and to maintain status of the various event tokens and multi-event tokens including whether they are available.

2. A multi-event queuing mechanism according to claim 1 wherein:
    said control means includes a control store for transmission of sets of control signals to effect the operation of the multi-event table means and output means in response to the decoding of a command from said at least one central processor.

3. A multi-event queuing mechanism according to claim 2 wherein:
    said input means includes a message buffer coupled to said control store to store additional processor commands for decoding by said control store.

4. A multi-event queuing mechanism according to claim 2 wherein:
    said input means is coupled to said at least one central processor to receive a command to assign an event to a given group of events which group is designated by a multi-event token.

5. A multi-event queuing mechanism according to claim 1 wherein:
    said multi-event table means includes a set of status words for each said multi-event token to be allocated, one of said words containing a pointer to the first event in the group of events to have occurred and a second pointer to the most recent event in said group to have occurred; and said event table means includes a set of status words for each said event token to be allocated, one of said words containing a pointer to the most previous event to have occurred and a second pointer to the next more recent event to have occurred.

6. In a processing system having at least one central processor and at least one memory module for storing a plurality of processes to be executed by said at least one processor, which processes require different events to occur before their execution can be completed, a multi-event queuing mechanism comprising:

input means coupled to said at least one central processor to receive a command to allocate one of an event token and a multi-event token to a process currently being executed;

event table means coupled to said input means to store status information about various events designated by allocated event tokens including whether that event token has been allocated and whether that event has occurred;

multi-event table means coupled to said input means and said event table means to store information about various events that have been grouped together designated by allocated multi-event tokens and to form a linked list of such events as each event occurs;

output means coupled to said event table means, said multi-event table means, and to said at least one central processor for transmission of a requested event token received from said event table means and a requested multi-event token received from said multi-event table means; and control means coupled to said input means, output means, event table means, and multi-event table means to respond to said command and to maintain status of the various event tokens and multi-event tokens including whether they are available;

said control means changing the event status in said event table means to has occurred in response to a command received by said input means.

7. A multi-event queuing mechanism according to claim 6 wherein:

said control means includes a control store for transmission of sets of control signals to effect the operation of the multi-event table means and output means in response to the decoding of a command from said at least one central processor.

8. A multi-event queuing mechanism according to claim 7 wherein:

said input means includes a message buffer coupled to said control store to store additional processor commands for decoding by said control store.

9. A multi-event queuing mechanism according to claim 7 wherein:

said input means is coupled to said at least one central processor to receive a command to assign an event to a given group of events which group is designated by a multi-event token.

10. A multi-event queuing mechanism according to claim 6 wherein:

said multi-event table means includes a set of status words for each said multi-event token to be allocated, one of said words containing a pointer to the first event in the group of events to have occurred and a second pointer to the most recent event in said group to have occurred; and said event table means includes a set of status words for each said event token to be allocated, one of said words containing a pointer to the most previous event to have occurred and a second pointer to the next more recent event to have occurred.

11. A multi-event queuing mechanism according to claim 1, 5, 6, or 10, wherein said control means is operable to selectively store in said multi-event table a count indicative of the number of times an event occurs.

* * * * *